United States Patent
Gniesmer et al.

(10) Patent No.: US 9,605,758 B2
(45) Date of Patent: Mar. 28, 2017

(54) STROKE PISTON FOR A STROKE PISTON COMPRESSOR

(75) Inventors: Volker Gniesmer, Alfeld (DE); Folkhard Holzel, Banteln (DE); Christian Schwarze, Hannover (DE); Christoph Wilken, Salzbergen (DE)

(73) Assignee: WABCO GmbH, Hannover (DE)

( * ) Notice: Subject to any disclaimer, the term of this patent is extended or adjusted under 35 U.S.C. 154(b) by 315 days.

(21) Appl. No.: 14/241,284

(22) PCT Filed: Jul. 7, 2012

(86) PCT No.: PCT/EP2012/002873
§ 371 (c)(1),
(2), (4) Date: Feb. 26, 2014

(87) PCT Pub. No.: WO2013/037436
PCT Pub. Date: Mar. 21, 2013

(65) Prior Publication Data
US 2015/0020681 A1    Jan. 22, 2015

(30) Foreign Application Priority Data

Sep. 13, 2011 (DE) .................. 10 2011 112 942
Apr. 3, 2012 (DE) .................. 10 2012 006 834

(51) Int. Cl.
*F04B 39/04* (2006.01)
*F16J 1/09* (2006.01)
(Continued)

(52) U.S. Cl.
CPC ............ *F16J 1/09* (2013.01); *F04B 39/0005* (2013.01); *F04B 39/042* (2013.01); *F16J 9/00* (2013.01); *F16J 9/22* (2013.01)

(58) Field of Classification Search
CPC ............ F16J 9/206; F16J 9/203; F04B 39/042
See application file for complete search history.

(56) References Cited

U.S. PATENT DOCUMENTS 2,951,732 A * 9/1960 Brenneke .................. F16J 9/02
                                                   277/451
3,554,568 A    1/1971 Held, Jr.
(Continued)

FOREIGN PATENT DOCUMENTS

CH    186 907       10/1936
DE    11 55 295     10/1963
(Continued)

*Primary Examiner* — F. Daniel Lopez
(74) *Attorney, Agent, or Firm* — Warner Norcross & Judd LLP (57) ABSTRACT

A stroke piston for a stroke piston compressor for generating compressed air for a vehicle, such as a commercial vehicle, includes a piston body with a piston floor, a piston skirt with piston skirt walls and pin hubs for receiving a piston pin, and at least two piston rings, which can be inserted into circumferential ring grooves of the piston body. Ridges of the piston body are provided between each two ring grooves and between the piston floor and the first ring groove arranged closest to the piston floor and the ring groove arranged closest to the piston skirt facing away from the other ring groove or grooves. At least one of the ridges is recessed at least over a partial section of its ridge height, which is measured parallel to the axis of the piston body, with at least one recess relative to the diameter of the piston body.

23 Claims, 5 Drawing Sheets (51) Int. Cl.
*F04B 39/00* (2006.01)
*F16J 9/22* (2006.01)
*F16J 9/00* (2006.01)

(56) References Cited

U.S. PATENT DOCUMENTS

| | | | |
|---|---|---|---|
| 3,921,988 | A | 11/1975 | Prasse et al. |
| 4,629,200 | A | 12/1986 | Ruddy |
| 4,972,764 | A | 11/1990 | Ohya et al. |
| 5,474,307 | A | 12/1995 | DeBiasse et al. |
| 5,711,206 | A | 1/1998 | Goettel |
| 6,935,220 | B2 * | 8/2005 | Dunaevsk ............... F16J 9/206 92/159 |
| 7,044,473 | B1 * | 5/2006 | Zhu ........................... F16J 9/06 277/434 |
| 2007/0261658 | A1 | 11/2007 | Abe et al. |
| 2008/0314241 | A1 | 12/2008 | Buschbeck et al. |

FOREIGN PATENT DOCUMENTS

| | | |
|---|---|---|
| DE | 1 193 632 | 5/1965 |
| DE | 19 42 133 | 2/1970 |
| DE | 17 75 655 A1 | 8/1971 |
| DE | 72 29 784 | 11/1972 |
| DE | 196 30 745 A1 | 2/1998 |
| DE | 10 2007 060 091 | 6/2009 |
| GB | 561 569 | 5/1944 |
| GB | 1 566 575 A1 | 5/1980 |
| JP | 2003314450 A | 11/2003 |
| JP | 2010096125 A | 4/2010 |
| WO | 03-044400 A1 | 5/2003 |

* cited by examiner

Fig. 10

STROKE PISTON FOR A STROKE PISTON COMPRESSOR

FIELD OF THE INVENTION

The invention generally relates to a reciprocating (stroke) piston for a reciprocating piston compressor for generating compressed air for a vehicle, especially, a commercial vehicle.

BACKGROUND OF THE INVENTION

In a piston compressor, the reciprocating piston comprises a piston body having a piston head, a piston skirt with piston skirt walls and preferably pin bosses for receiving a gudgeon pin. At least two, preferably three, piston rings, can be introduced into encircling ring grooves in the piston body, of which at least the piston ring closer to the piston head is a compression ring and at least one piston ring, preferably the piston ring closest to the piston skirt, is an oil control ring. Lands are provided on the piston body between each pair of ring grooves and between the piston head and the ring groove arranged closest to the piston head, and on that side of the ring groove arranged closest to the piston skirt that faces away from the other ring groove or grooves.

In the case of a reciprocating piston compressor of the general type under consideration, there may be an unpleasant or toxic discharge of oil into the air. This discharged oil, which is carried in the air, can cause contamination of the systems supplied with this air or even of other, downstream systems, which can lead to problems that can be rectified only with great difficulty in servicing terms, and which can shorten the life of the systems. Also, this contaminated air may cause increased environmental pollution.

SUMMARY OF THE INVENTION

Generally speaking, it is an object of the present invention to improve the cleanliness of the air delivered in respect of the oil discharge described above.

According to an embodiment of the present invention, in a reciprocating piston of the general type under consideration, at least one of the lands of the piston body is set back from the diameter of the piston body by at least one recess, at least over a partial section of its land height, measured parallel to the axis of the piston body. This results in an overall improvement in the sealing behavior of the reciprocating piston. In particular, it is possible to achieve compensating volumes or flow cross sections in the zone of the piston rings (ring zone), by which it is possible to set specific ring interspace pressures and/or by which the flow behavior of oil-containing air in respect of oil discharge from the drive-side space of the reciprocating piston compressor is made more difficult.

According to an embodiment of the present invention, lands of the piston body are configured with different geometries by means of recesses and/or configured differently by means of recesses. By this, the flow cross sections of the reciprocating piston can be varied particularly well in order to improve the capability of the piston to prevent leaks in respect of any possible oil discharge or transfer or passage. The "fire land" of the reciprocating piston, which is situated between the piston head and the piston ring arranged closest to it, can also be included in these measures.

The recess in one of the respective affected lands (i) can be or have a step, (ii) can be or have a groove encircling the piston body, and/or (iii) can be or have a chamfer encircling the piston body.

A chamfer of this kind can be adjacent to a ring groove and/or can face or face away from the ring groove.

According to another embodiment, at least one recess can encircle the piston body in a rotationally asymmetrical and/or eccentric manner with respect to the axis of the piston body. In such case, different dimensions of the asymmetry and/or eccentricity can be provided, especially in the direction of connecting rod oscillation, in relation to the gudgeon pin direction of the reciprocating piston.

The orbital path of the recess can substantially follow an oval or an elliptical shape or a free form.

Irrespective of any asymmetry or eccentricity in respect of the overall orbital path of the recess, at least one recess can encircle the piston body with an inconstant recess depth, i.e., to have continuous or even section-wise differences in radial recess depth. It is ultimately also possible to achieve asymmetry or eccentricity itself by means of an inconstant recess depth.

For the capability of the reciprocating piston to prevent leaks, measures are also preferably taken as regards the associated piston rings or the selection thereof. It is possible for at least one piston ring to be designed as a compression ring, and for a taper-faced Napier ring to be provided for this purpose.

At least one other piston ring can be an oil control ring, and, for this purpose, can be a coil spring loaded slotted oil control ring, preferably a coil spring loaded double beveled oil control ring or a coil spring loaded beveled edge oil control ring. As a preferred option, two compression rings and one oil control ring can be used in order to maintain redundancy, particularly, in respect of the compression effect, if a piston ring breaks, for example.

According to a further embodiment, the coil spring loaded oil control ring provided as an oil control ring has at least two outward-projecting lands. Oil tightness in this region is thereby advantageously improved.

Preferably, the lands have land heights that, when measured parallel to the axis of the piston ring, correspond jointly to no more than 20% of the height of the piston ring and correspond individually to no more than 10% each of the height of the piston ring. However, further improvements can be achieved if the lands have land heights that, when measured parallel to the axis of the piston ring, are different.

In the case of a coil spring loaded double beveled oil control ring or coil spring loaded beveled edge oil control ring, which are provided as preferred options, the lands have connection angles, preferably, of 0 to 60 degrees. Connection angles of the lands could furthermore have a different and/or asymmetric angle size.

According to another embodiment, the oil control ring has at least one oil drainage facility, preferably, a plurality of oil drainage facilities, for the radial passage of oil. The oil drainage facility (facilities) can be embodied as a hole (holes) or as a slot (slots), for example. Oil transfer is thereby advantageously further reduced.

If, in addition, the ring groove provided for an oil control ring has at least one oil drainage facility, preferably, a plurality of oil drainage facilities, this respective oil drainage facility can be closed with respect to a hollow interior of the piston body. That is, for example, it can be designed to resemble a bowl or hay, or can lead into a hollow interior of the piston body, and, at the same time, an oil drainage facility of the oil control ring can preferably correspond at least partially to at least one oil drainage facility of the ring groove. The oil drainage facility of the ring groove can extend in the form of a slot in the circumferential direction of the ring groove.

Still other objects and advantages of the present invention will in part be obvious and will in part be apparent from the specification.

The present invention accordingly comprises the features of construction, combinations of elements, and arrangement of parts, all as exemplified in the constructions herein set forth, and the scope of the invention will be indicated in the claims.

BRIEF DESCRIPTION OF THE DRAWINGS

The invention is explained in greater detail below using exemplary embodiments and with reference to the accompanying drawing figures, in which:

FIGS. 4 a) to d) show further illustrative embodiments of details according to FIG. 2;

FIGS. 5 a) to d) and FIGS. 6 a) to d) show different possibilities for recess shapes in lands according to FIG. 1 or 4;

FIGS. 9 a) to c) show an exemplary oil control ring in various sectional and detail views;

DETAILED DESCRIPTION OF THE PREFERRED EMBODIMENTS

Figure 1:
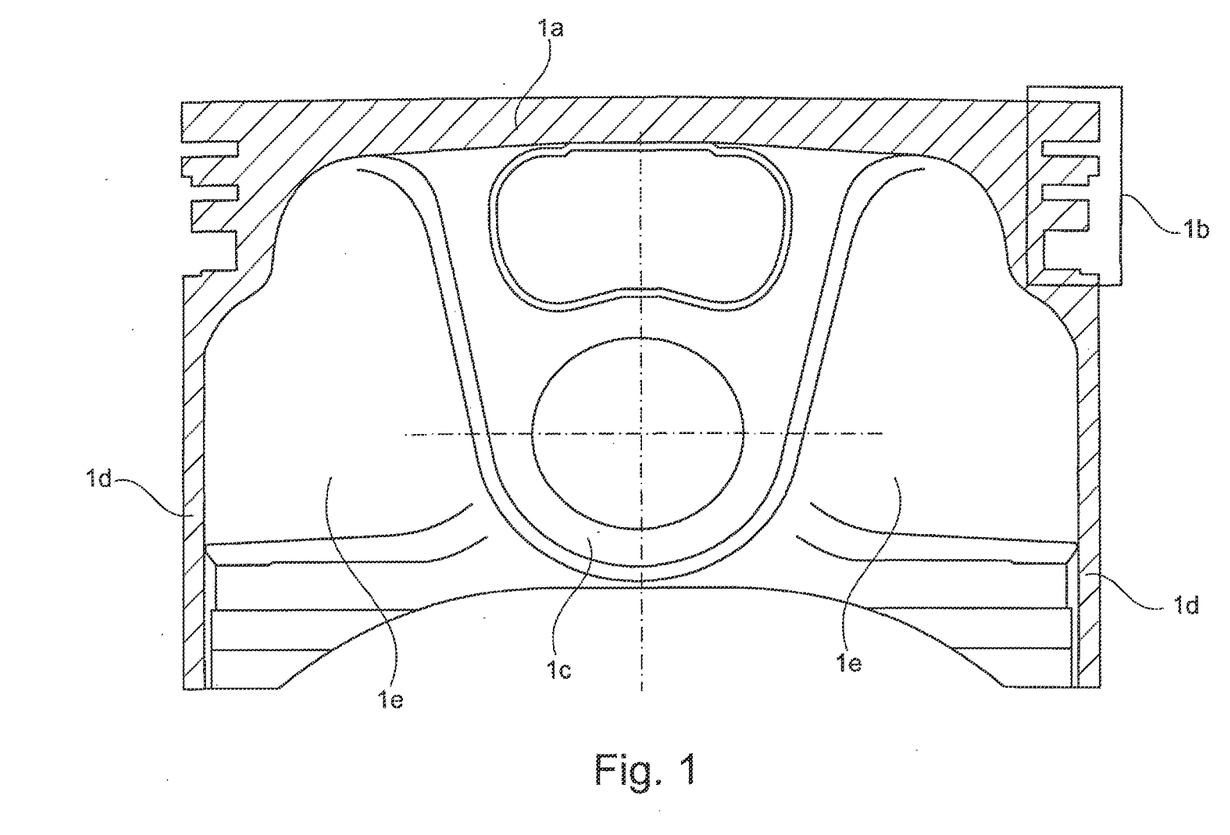
FIG. 1 shows a section through a reciprocating piston according to an embodiment of the present invention.

FIG. 1 shows a section through a reciprocating piston according to an embodiment of the present invention. The reciprocating piston has a piston head 1a, pin bosses 1c, a piston skirt with loadbearing piston skirt walls 1d and box walls 1e, which connect the piston skirt walls 1d to the pin bosses 1c.

Moreover, the reciprocating piston has a ring zone 1b with three ring grooves, which are described in greater detail below. However, as shown in FIG. 1, some of the lands delimiting the ring grooves can have recesses.

Figure 2:
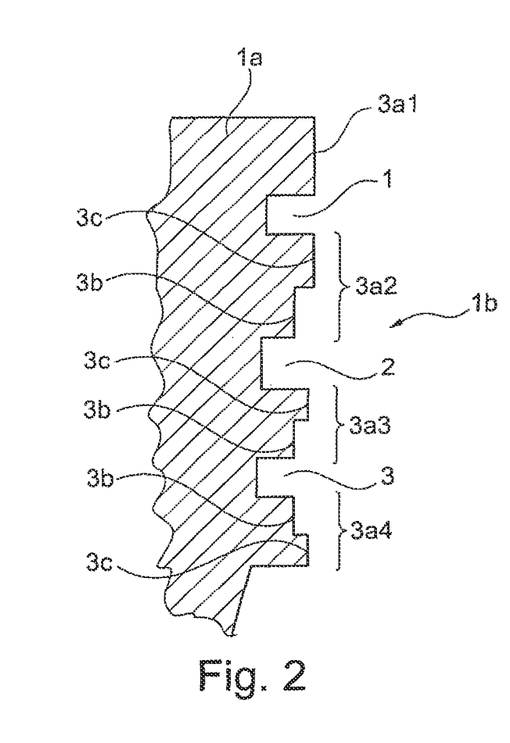
FIG. 2 shows the detail 1b in FIG. 1 on an enlarged scale.

FIG. 2 show the ring zone 1b according to FIG. 1 on an enlarged scale. The ring grooves are numbered as a first ring groove 1, a second ring groove 2 and a third ring groove 3, starting from the piston head 1a. The lands delimiting the three ring grooves are likewise numbered consecutively as a first land 3a1, a second land 3a2, a third land 3a3 and a fourth land 3a4. The first land 3a1 is the "fire land". Lands 3a2 to 3a4 show examples of encircling recesses 3b, which are set back or notched radially relative to the outer circumferential surfaces 3c of the reciprocating piston. In the illustrative embodiment shown in FIG. 2, the recesses 3b are each set back in the form of steps.

Figure 3:
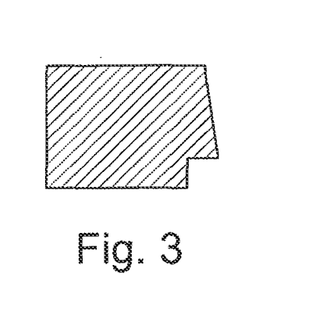
FIG. 3 shows a cross section through a compression ring designed as a taper-faced Napier ring.

The first ring groove 1 and the second ring groove 2 are provided for compression rings, which, as shown in section by way of example in FIG. 3, can be designed as taper-faced Napier rings.

Figure 9:
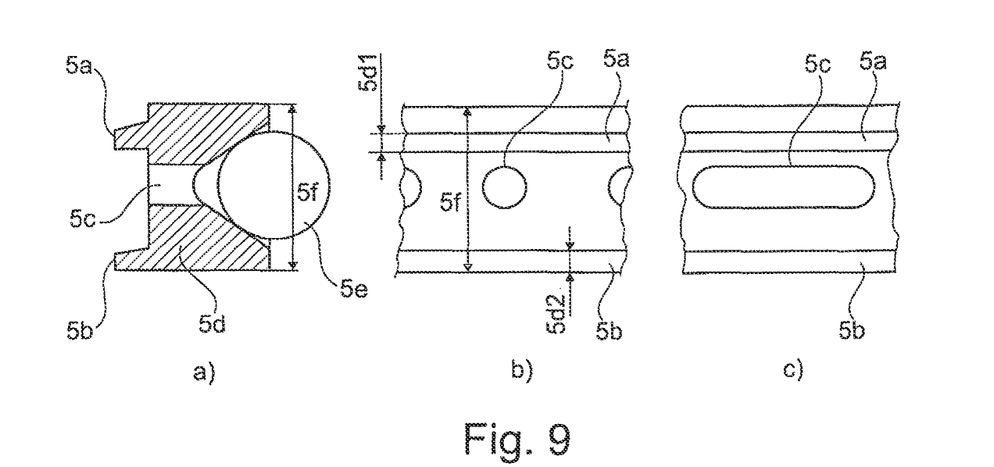
Figure 10:
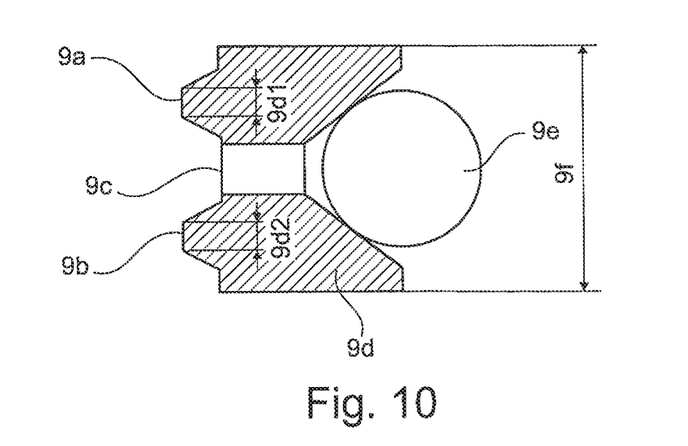
FIG. 10 shows a sectional view of another illustrative embodiment of an oil control ring.

The third ring groove 3 is provided for an oil control ring of the kind shown, for example, in FIG. 9 or 10.

Figure 4:
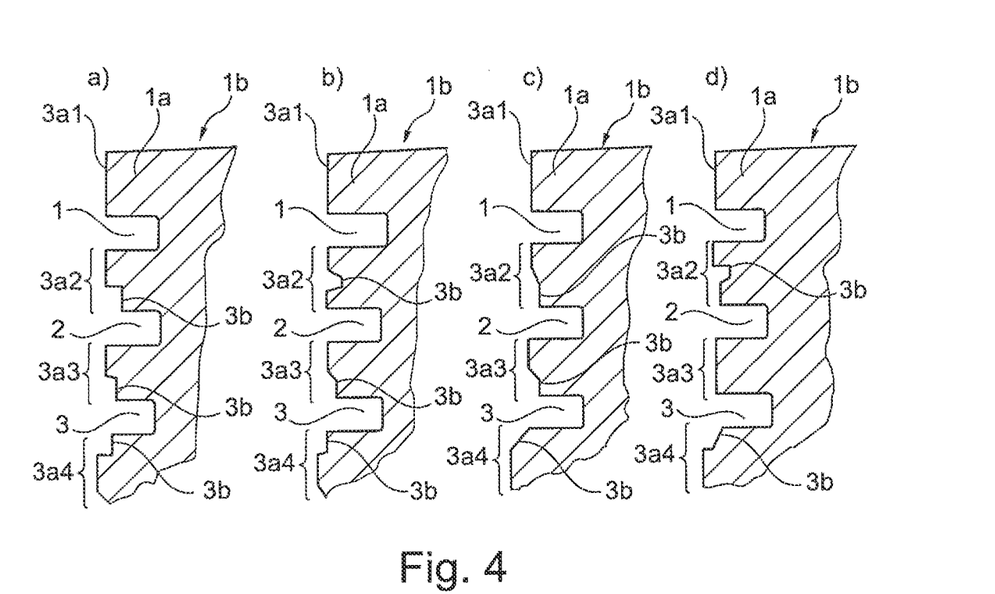

FIGS. 4 a) to d) show further possible illustrative embodiments of a ring zone 1b, in which the respective lands 3a2 to 3a3 show different possible cross sectional shapes of recesses 3b. The fire land 3a1 can also have a recess. The lands 3a1 to 3a4 shown in FIGS. 4a) to d) can also be varied independently of one another. Here, the reference signs correspond to those in FIG. 2.

Figure 5:
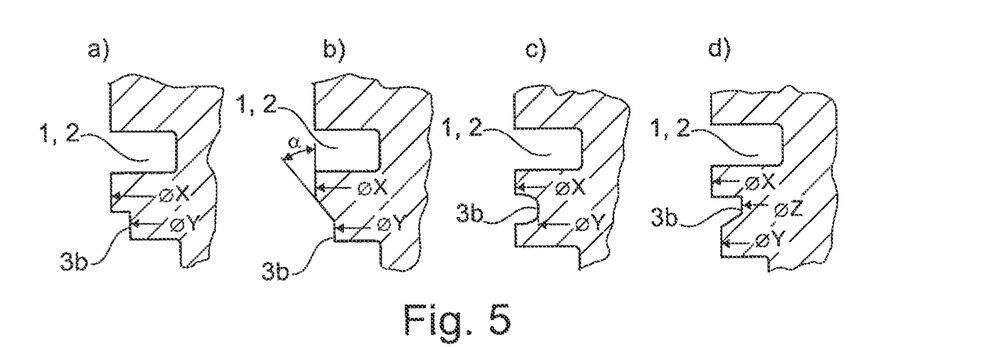

FIGS. 5 a) to d) show further possible cross sections of the recesses 3b, in particular of the land below the compression piston ring grooves (first ring groove 1 and/or second ring groove 2).

Figure 6:
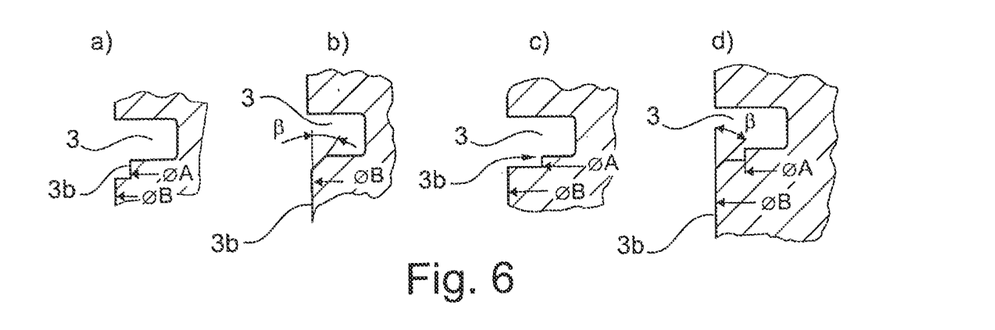

FIGS. 6 a) to d) show further possible cross sections of the recesses 3b, in particular for the land below the oil control piston ring groove (third ring groove 3).

In FIG. 5a), the diameter ØY of the recess 3b is set back in the form of a step from the diameter ØX of the piston skirt or piston skirt wall 1d (see FIG. 1), i.e., the diameter ØX of the piston skirt is greater than the diameter ØY of the recess 3b. The configuration in FIG. 5b) is similar to that according to FIG. 5a), but, here, a chamfer at an angle α is provided between the diameter ØX and the diameter ØY. According to FIG. 5c), the recess 3b is in the form of a groove, wherein the diameter ØY of the groove is less than the diameter ØX of the piston skirt. FIG. 5d) shows a combination of FIG. 5a) or 5b) and FIG. 5c), in which both the diameter ØZ of a groove of the recess 3b and a region of the recess situated below the groove and having a diameter ØY are less than the diameter ØX of the piston skirt.

According to FIG. 6a), the diameter ØA of the recess 3b is set back from the diameter ØB of the piston skirt or of the piston skirt wall 1d (see FIG. 1) in the form of a step, i.e., the diameter ØB of the piston skirt is greater than the diameter ØA of the recess 3b. The configuration in FIG. 6b) is similar to that according to FIG. 6a), but, here, a chamfer at an angle β relative to the third ring groove 3 is provided at the diameter ØB. FIG. 6e) is similar to FIG. 6a), but, here, the depth of the recess 3b is less than in FIG. 6a), FIG. 6d) is a combination of FIG. 6a) or 6c) and FIG. 6b). Here, the diameter ØB of the piston skirt is once again greater than the diameter ØA of the recess 3b and, in addition, a chamfer at an angle β is arranged between the diameter ØB of the piston skirts and the diameter ØA of the recess 3b.

Figure 7:
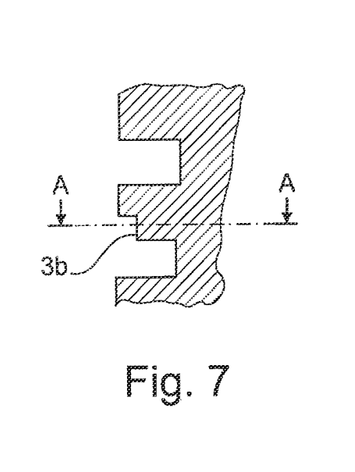
FIG. 7 shows a detail of a land with a recess in section.
Figure 8:
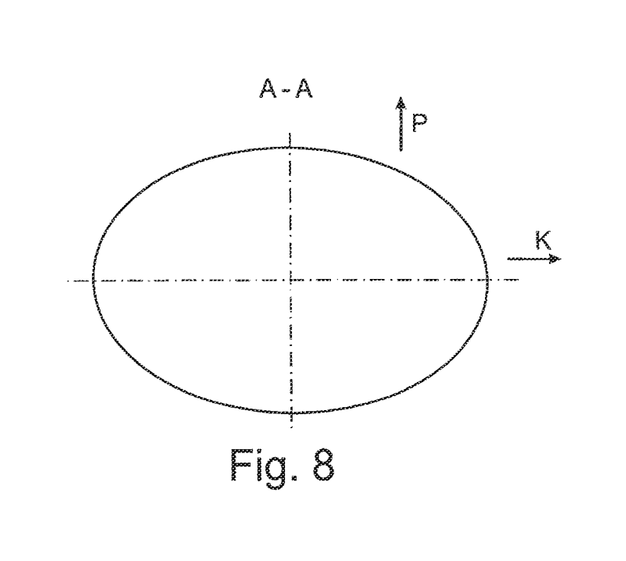
FIG. 8 shows a circumferential line of the recess according to FIG. 7 in a plan view of the section line indicated by A, A in FIG. 7.

FIG. 7 shows a cross sectional view of any land between ring grooves having a recess 3b with a section line A, A. If this section line A, A is viewed in accordance with FIG. 8, it is clear from this example that the recess 3b can also be formed asymmetrically and/or eccentrically with respect to the axis of the reciprocating piston. That is, the cutting depth of the recess 3b can vary in size, for example, in the course of its orbit. In particular, an oval shape or elliptical shape of the recess orbit is conceivable. Here, the direction of the gudgeon pin is indicated by an arrow K and the direction of connecting rod oscillation is indicated by an arrow P.

FIGS. 9 and 10 show in section, on the one hand, an example of a coil spring loaded double beveled oil control ring (FIG. 9) and, on the other hand, of a coil spring loaded beveled edge oil control ring (FIG. 10) as a possible embodiment of an oil control ring. The examples of an oil control ring each have a main body 5d or 9d with two radially projecting lands 5a, b and 9a, b. Moreover, both illustrative embodiments have a spring element 5e or 9e. Respective holes 5c and 9c are provided between the lands 5a, hand 9a, b as oil drains in both examples. As FIGS. 5b) and 5c) show, these oil drains can be designed as holes 5c1 distributed over the circumference of the oil control ring or, alternatively, as more extended slots 5c2.

The coil spring loaded double beveled oil control ring shown in FIG. 9 can, for example, be of a geometrical design such that the land height 5*d*1 of land 5*a* added to the land height 5*d*2 of land 5*b* is less than 20% of the ring height 5*f* of the overall coil spring loaded double beveled oil control dog ring, wherein the respective land heights 5*d*1 and 5*d*2 are each only 10% of the ring height 5*f*. If the ring height 5*f*=4 mm, for example, it follows that the land height 5*d*1 of land 5*a* and the land height 5*d*2 of land 5*b* must each be less than 0.4 mm.

The coil spring loaded beveled edge oil control ring shown in FIG. 10 can, for example, be of a geometrical configuration such that the land height 9*d*1 of land 9*a* added to the land height 9*d*2 of land 9*b* is less than 20% of the ring height 9*f* of the overall coil spring loaded double beveled oil control ring, wherein the respective land heights 9*d*1 and 9*d*2 are each only 10% of the ring height 9*f*. If the ring height 9*f*=4 mm, for example, it follows that the land height 9*d*1 of land 9*a* and the land height 9*d*2 of land 9*b* must each be less than 0.4 mm.

Preferably, lands 5*a, b* and 9*a, b* should have an axial height such that the respective land height is no more than 10% of the total height of the oil control ring and the land heights together are no more than 20% of this total height of the oil control ring.

The connection angles can vary, as is likewise indicated, merely by way of example, in FIGS. 9 and 10.

Figure 11:
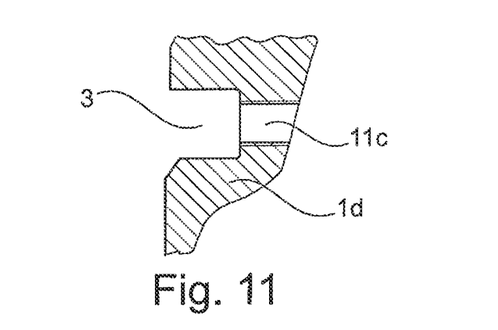
FIG. 11 and FIG. 12 show two different examples of a ring groove for an oil control ring in section.
Figure 12:
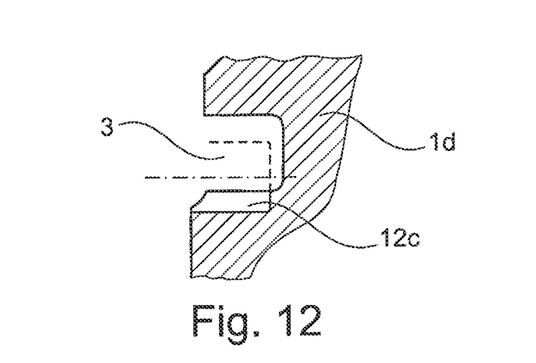

Yet another possible example of a third ring groove 3 for an oil control ring is shown in section in FIGS. 11 and 12. In these figures, the third ring groove 3 can also have at least one, preferably a plurality of, oil drain(s) 11*c* and 12*c*, which can pass through the piston skirt wall 1*d* (in the case of 11*c*) or be designed as a blind hole (in the case of 12*c*) and can correspond at least partially to the oil drains 5*c* (FIG. 9) and 9*c* (FIG. 10) of the oil control ring.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A reciprocating piston for a reciprocating piston compressor for generating compressed air for a vehicle, the reciprocating piston comprising:
   a piston body having a piston head,
   a piston skirt with piston skirt walls and pin bosses for receiving a gudgeon pin;
   a first ring groove being disposed closest to the piston head, a third ring groove being disposed closest to the piston skirt,
   a first piston ring being a compression ring disposed in the first ring groove and a second piston ring being an oil control ring disposed in the third ring groove; and
   a plurality of lands on the piston body, the plurality of lands including a land between the first ring groove and the third ring groove, a land on a side of the first ring groove distal from the third ring groove, and a land on a side of the third ring groove distal from the first ring groove, at least one of the plurality of lands being set back from a diameter of the piston body in the form of at least one recess at least over a partial section of a land height measured parallel to an axis of the piston body,
   wherein the at least one recess includes a depth, relative to the axis of the piston body, that varies continuously about the circumference of the recess.

2. The reciprocating piston as claimed in claim 1, wherein a second one of the plurality of lands is configured with a different recess.

3. The reciprocating piston as claimed in claim 2, wherein the recess of the second one of the plurality of lands has a step.

4. The reciprocating piston as claimed in claim 1, wherein the at least one recess includes a groove encircling the piston body.

5. The reciprocating piston as claimed in claim 1, wherein the at least one recess includes a chamfer encircling the piston body.

6. The reciprocating piston as claimed in claim 5, wherein the chamfer is adjacent to one of the first and third ring grooves and faces toward or faces away from one of the first and third ring grooves.

7. The reciprocating piston as claimed in claim 1, wherein the at least one recess encircles the piston body in a rotationally asymmetrical manner with respect to the axis of the piston body.

8. The reciprocating piston as claimed in claim 7, wherein the at least one recess includes an orbital path that is substantially an elliptical shape.

9. The reciprocating piston as claimed in claim 1, wherein at least one of the first and second piston rings is a taper-faced Napier ring.

10. The reciprocating piston as claimed in claim 1, wherein the second piston ring is a coil spring loaded slotted oil control ring.

11. The reciprocating piston as claimed in claim 10, wherein the coil spring loaded slotted oil control rig has at least two outward-projecting lands.

12. The reciprocating piston as claimed in claim 11, wherein the outward-projecting lands of the coil spring loaded slotted oil control ring have land heights that, when measured parallel to the axis of that piston ring, correspond jointly to no more than 20% of the height of that piston ring and correspond individually to more than 10% of the height of that piston ring.

13. The reciprocating piston as claimed in claim 11, wherein the outward-projecting lands of the coil spring loaded slotted oil control ring have land heights that, when measured parallel to the axis of that piston ring, are different.

14. The reciprocating piston as claimed in claim 11, wherein connection angles of the outward-projecting lands of the coil spring loaded slotted oil control ring are in the range of about 0 to 60 degrees.

15. The reciprocating piston as claimed in claim 11, wherein connection angles of the outward-projecting lands of the coil spring loaded slotted oil control ring have different angle sizes.

16. The reciprocating piston as claimed in claim 10, wherein the coil spring loaded slotted oil control ring is one of a coil spring loaded double beveled oil control ring and a coil spring loaded beveled edge oil control ring.

17. The reciprocating piston as claimed in claim 1, wherein the oil control ring has at least one oil drain for the radial passage of oil.

18. The reciprocating piston as claimed in claim 17, wherein the at least one oil drain is one of a hole and a slot.

19. The reciprocating piston as claimed in claim 17, wherein the at least one oil drain is a slot and extends in a circumferential direction of the oil control ring.

20. The reciprocating piston as claimed in claim 17, wherein the at least one oil drain of the oil control ring corresponds at least partially to at least one oil drain of the third ring groove.

21. The reciprocating piston as claimed in claim 1, wherein the third ring groove has at least one oil drain.

22. The reciprocating piston as claimed in claim 1, wherein the third ring groove includes an oil drain that is closed with respect to a hollow interior of the piston body.

23. The reciprocating piston as claimed in claim 1, wherein the third ring groove includes an oil drain that leads into a hollow interior of the piston body.

* * * * *

UNITED STATES PATENT AND TRADEMARK OFFICE
CERTIFICATE OF CORRECTION

| | | |
|---|---|---|
| PATENT NO. | : 9,605,758 B2 | Page 1 of 1 |
| APPLICATION NO. | : 14/241284 | |
| DATED | : March 28, 2017 | |
| INVENTOR(S) | : Volker Gniesmer et al. | |

It is certified that error appears in the above-identified patent and that said Letters Patent is hereby corrected as shown below:

In the Claims

Column 6, Claim 11, Line 36:
"control rig"

Should read:
--control ring-- and

Column 6, Claim 12, Line 43:
"individually to more than 10%"

Should read:
--individually to no more than 10%--

Signed and Sealed this
Sixth Day of June, 2017

Michelle K. Lee
*Director of the United States Patent and Trademark Office*